US009055435B2

(12) United States Patent  
Ekberg et al.

(10) Patent No.: US 9,055,435 B2  
(45) Date of Patent: Jun. 9, 2015

(54) METHOD AND APPARATUS FOR SECURITY MECHANISM FOR PROXIMITY-BASED ACCESS REQUESTS

(71) Applicant: Nokia Technologies Oy, Espoo (FI)

(72) Inventors: Jan-Erik Ekberg, Vantaa (FI); Jari-Jukka Harald Kaaja, Järvenpää (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 36 days.

(21) Appl. No.: 13/720,202

(22) Filed: Dec. 19, 2012

(65) Prior Publication Data

US 2014/0173690 A1    Jun. 19, 2014

(51) Int. Cl.
*G06F 7/04* (2006.01)
*G06F 15/16* (2006.01)
*G06F 17/30* (2006.01)
*H04L 29/06* (2006.01)
(Continued)

(52) U.S. Cl.
CPC ............... *H04W 12/04* (2013.01); *H04L 63/08* (2013.01); *H04L 63/10* (2013.01); *H04L 63/107* (2013.01); *H04W 12/08* (2013.01); *H04L 63/20* (2013.01)

(58) Field of Classification Search
CPC ....... H04L 63/107; H04L 63/08; H04L 63/10; H04L 63/20; H04W 12/08; H04W 12/04
USPC .......................................................... 726/3
See application file for complete search history.

(56) References Cited

U.S. PATENT DOCUMENTS

| 3,824,595 A | 7/1974 | Hall |
| 7,026,992 B1 * | 4/2006 | Hunt et al. .................... 342/465 |
| 2004/0032363 A1 | 2/2004 | Schantz et al. |

(Continued)

FOREIGN PATENT DOCUMENTS

| FR | 2927495 A1 | 8/2009 |
| WO | 2011000391 A1 | 6/2009 |

OTHER PUBLICATIONS

Notification of Transmittal of the International Search Report and the Written Opinion of the International Searching Authority, or the Declaration; International Search Report; Written Opinion for corresponding Application No. PCT/FI2013/051060, dated Mar. 12, 2014, 16 pages.

(Continued)

*Primary Examiner* — Kambiz Zand
*Assistant Examiner* — Benjamin Kaplan
(74) *Attorney, Agent, or Firm* — Alston & Bird LLP

(57) ABSTRACT

An approach is provided for providing security mechanism for proximity-based interactions among devices. At least one first device (e.g., a memory tag) may determine a request for interaction between the at least one first device and at least one second device (e.g., a mobile phone), wherein at least the at least one first device is associated with at least one first antenna and at least one second antenna. The at least one first device may determine a first signal received by the at least one first antenna and a second signal received by the at least one second antenna. Further, the at least one first device may determine one or more differences in one or more characteristics of the first signal and the second signal. Furthermore, the at least one first device may process and/or facilitate a processing of the one or more differences to determine whether to allow the interaction.

20 Claims, 10 Drawing Sheets

(51) Int. Cl.
*H04W 12/04* (2009.01)
*H04W 12/08* (2009.01)

(56) References Cited

U.S. PATENT DOCUMENTS

2006/0176147 A1* 8/2006 Pohlmann et al. ............ 340/5.61
2006/0242414 A1* 10/2006 Corson et al. ................. 713/171
2009/0143028 A1   6/2009 Kim
2013/0155842 A1*  6/2013 Moore et al. .................. 370/221

OTHER PUBLICATIONS

Haselseiner et al., "Security in Near Field Communication (NFC)", Workshop on RIFD Security 2006 [online], Jul. 12-14, 2006 [retrieved on Feb. 12, 2014]. Retrieved from the internet ,URL: http://events.isik.tugraz.at/RFIDSec06/Program/papers/002%20%20Security%20in%20NFC.pdf, 11 pages.

Capps, "Near Field or Far Field?", EDN Network [online], Aug. 16, 2001 [retrieved on Feb. 12, 2014]. REtrieved from the Internet: ,URL: http://m.eet.com/media/114093/19213-150858.pdf. pp. 59-102.

* cited by examiner

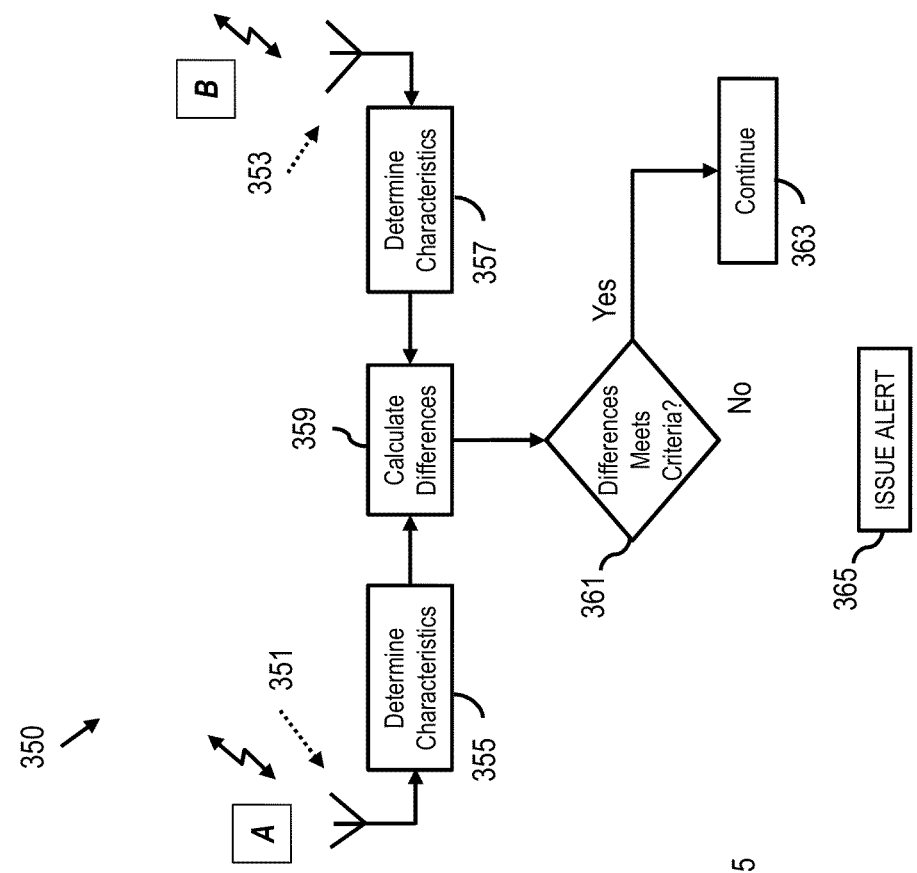
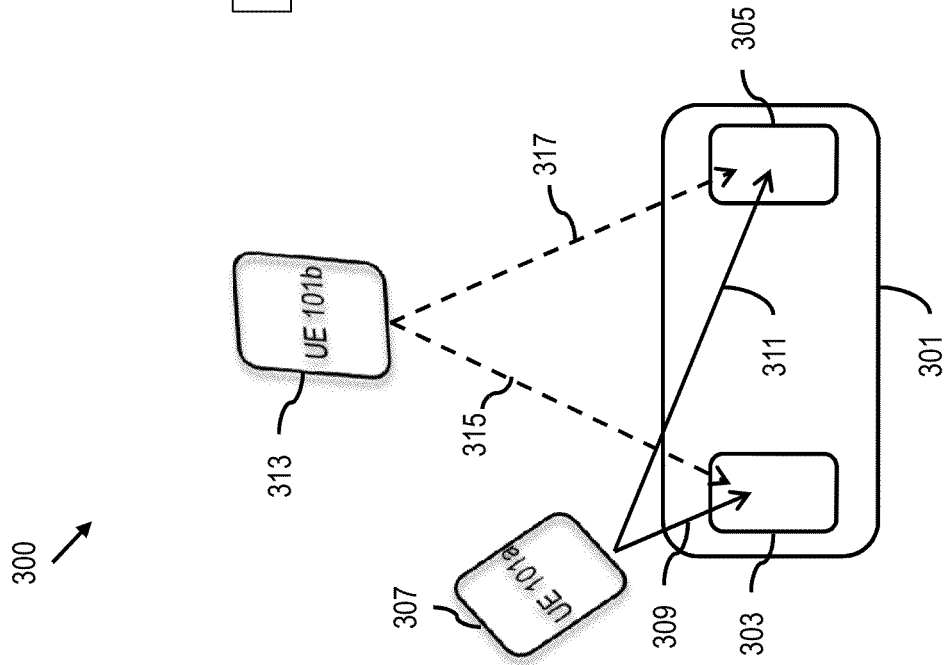

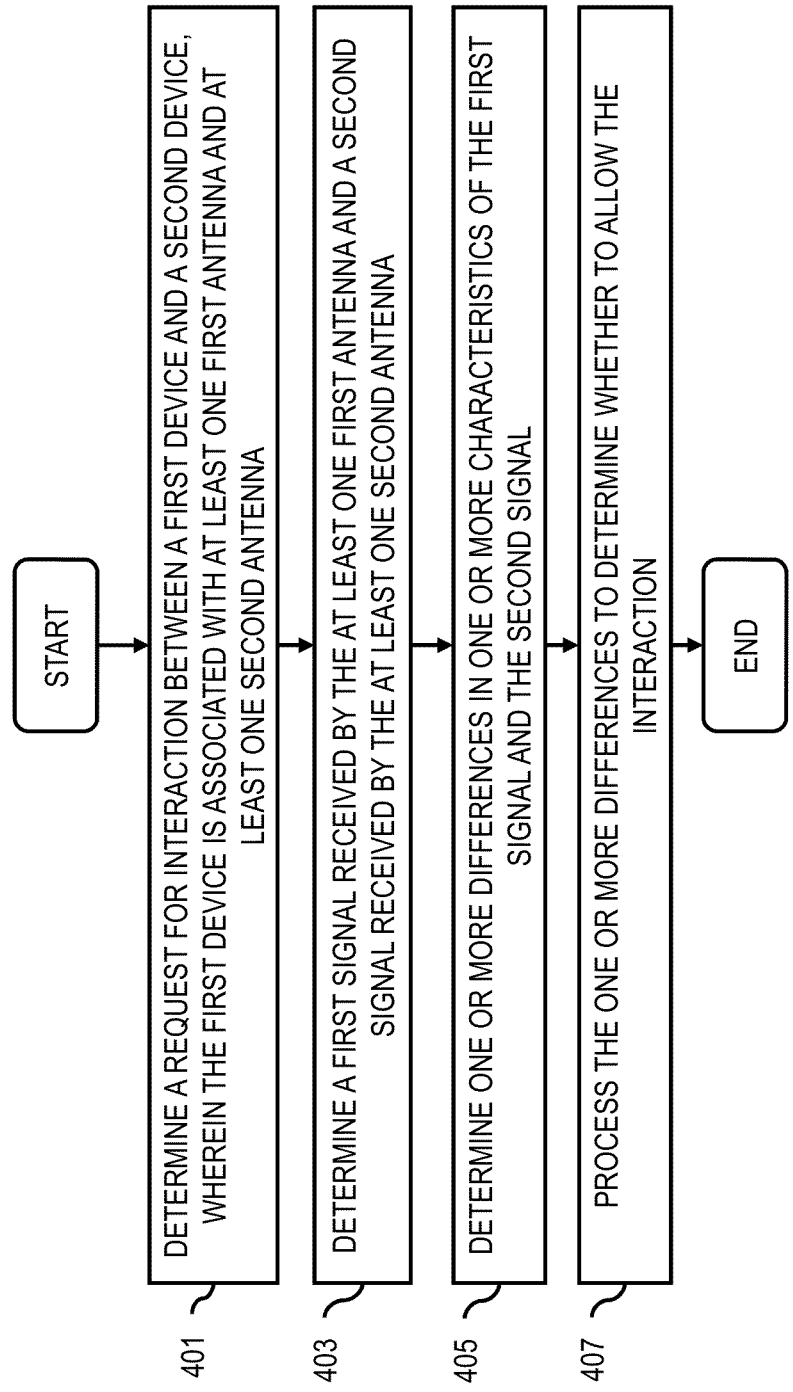

METHOD AND APPARATUS FOR SECURITY MECHANISM FOR PROXIMITY-BASED ACCESS REQUESTS

BACKGROUND

Service providers (e.g., wireless, cellular, etc.) and device manufacturers are continually challenged to deliver value and convenience to consumers by, for example, providing compelling network services. One area of interest is providing the capability of proximity-based wireless communication among user devices where users may utilize various devices (e.g., mobile phones, smart cards, memory tags, etc.) to communicate with other nearby devices for a range of tasks and/or services, for example, to share content and information, pay for purchased services and content, and the like. In various scenarios, users may use a device to interface with vending machines, kiosks, smart posters, billboards, etc., where various user information may be transferred via the communication link (e.g., near field communication (NFC)). However, in many instances sensitive user information such as credit card numbers, passwords, user identification information, etc. may be transferred between the devices whereby the sensitive information may be requested by and/or unintentionally transferred to unauthorized devices.

SOME EXAMPLE EMBODIMENTS

Therefore, there is a need for an approach for security mechanism for proximity-based interactions among devices.

According to one embodiment, a method comprises determining a request for interaction between at least one first device and at least one second device, wherein at least the at least one first device is associated with at least one first antenna and at least one second antenna. The method also comprises determining a first signal received by the at least one first antenna and a second signal received by the at least one second antenna. Further, the method also comprises determining one or more differences in one or more characteristics of the first signal and the second signal. Additionally, the method also comprises processing and/or facilitating a processing of the one or more differences to determine whether to allow the interaction.

According to another embodiment, an apparatus comprises at least one processor, and at least one memory including computer program code for one or more computer programs, the at least one memory and the computer program code configured to, with the at least one processor, cause, at least in part, the apparatus to determine a request for interaction between at least one first device and at least one second device, wherein at least the at least one first device is associated with at least one first antenna and at least one second antenna. The apparatus is further caused to determine a first signal received by the at least one first antenna and a second signal received by the at least one second antenna. Further, the apparatus is also caused to determine one or more differences in one or more characteristics of the first signal and the second signal. Additionally, the apparatus is also caused to process and/or facilitate a processing of the one or more differences to determine whether to allow the interaction.

According to another embodiment, a computer-readable storage medium carrying one or more sequences of one or more instructions which, when executed by one or more processors, cause, at least in part, an apparatus to determine a request for interaction between at least one first device and at least one second device, wherein at least the at least one first device is associated with at least one first antenna and at least one second antenna. The apparatus is further caused to determine a first signal received by the at least one first antenna and a second signal received by the at least one second antenna. Further, the apparatus is also caused to determine one or more differences in one or more characteristics of the first signal and the second signal. Additionally, the apparatus is also caused to process and/or facilitate a processing of the one or more differences to determine whether to allow the interaction.

According to another embodiment, an apparatus comprises means for determining a request for interaction between at least one first device and at least one second device, wherein at least the at least one first device is associated with at least one first antenna and at least one second antenna. The apparatus further comprises means for determining a first signal tag received by the at least one first antenna and a second signal tag received by the at least one second antenna. Further, the apparatus also comprises means for determining one or more differences in one or more characteristics of the first signal and the second signal. Additionally, the apparatus also comprises means for processing and/or facilitating a processing of the one or more differences to determine whether to allow the interaction.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3C illustrate various diagrams and schematics of processes and device interactions in the system 100, according to various embodiments;

FIG. 4 is a flowchart of a process for, at least, determining a request for interaction among devices, according to an embodiment;

DESCRIPTION OF SOME EMBODIMENTS

Examples of a method, apparatus, and computer program for providing security mechanism for proximity-based interactions between devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "request for interaction" refers to one or more requests from one or more devices to interact with each other. By way of example, the request and/or the interaction may be facilitated by use of one or more proximity-based communication methods. Further, the interaction among the devices may include requesting for access, granting access, reading, writing, modifying, accessing, enquiring, and the like actions, wherein the actions may be performed by one or more devices which may have access to one or more data items. Furthermore, a "memory tag" may refer to a wireless memory tag, an RFID memory tag, and the like, which may be embedded into a device (e.g., a mobile device) or may be a stand-alone device (e.g., as a memory card/tag.)

Figure 1:
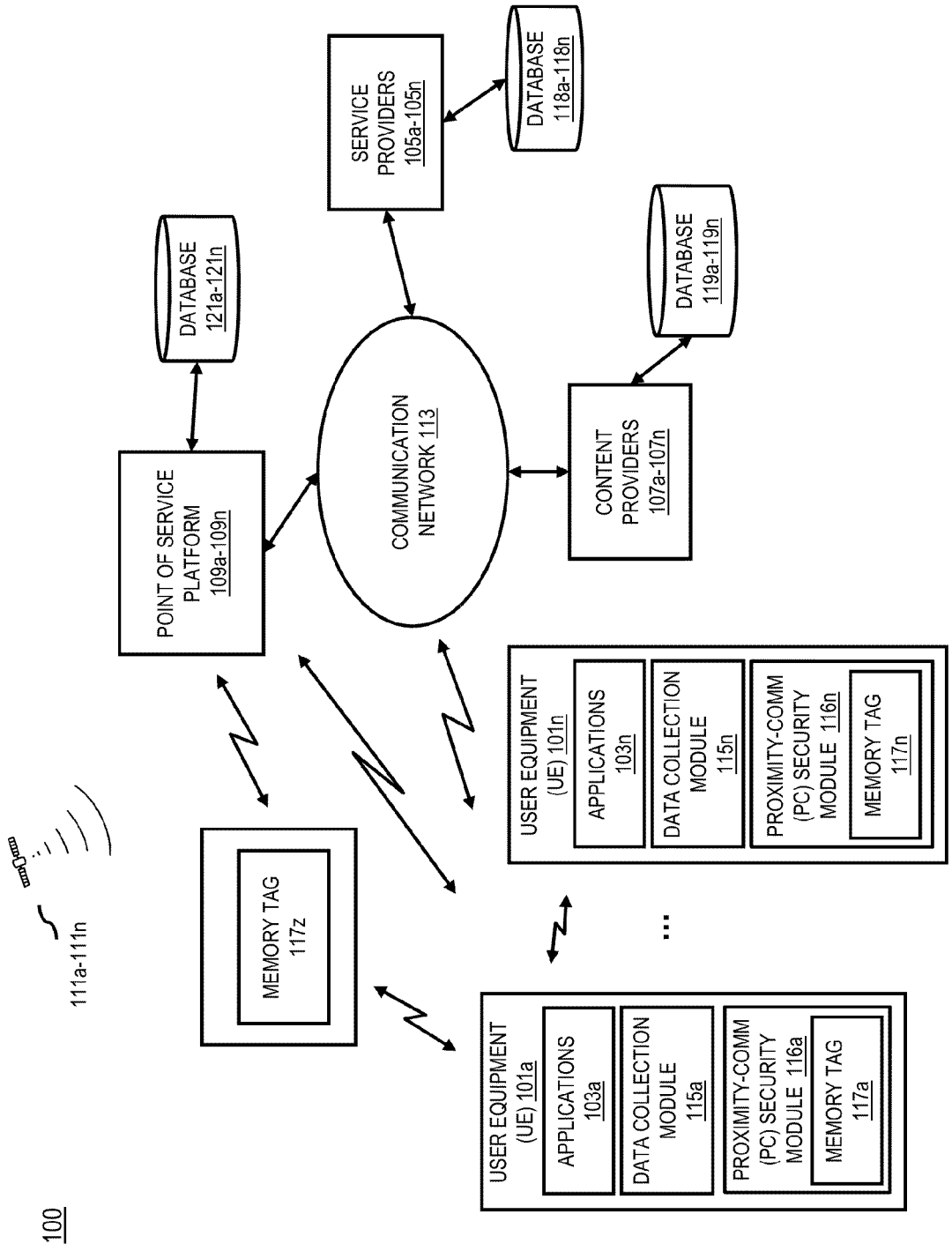
FIG. 1 is a diagram of a system capable of providing security mechanism for proximity-based interactions among devices, according to an embodiment.

FIG. 1 is a diagram of a system capable of providing security mechanism for proximity-based interactions among devices, according to an embodiment. Generally, devices in close proximity may request for and/or utilize proximity-based communication links (e.g., short range radio links), for example by use of radio frequency identification (RFID), for transferring of user, device, and/or service provider information from one device to one or more other devices, wherein the information may be generic or specific to the user, the device, and/or to a service provider. For example, the transferred information may be advertisement from vendors and service providers to a plurality of devices/consumers located near one or more point of service (POS) platforms such as kiosks, wireless memory tags (e.g., RFID tags), billboards, product packaging, and the like. In other instances, users may intend to transfer specific information (e.g., credit card information) from and/or to a specific device, wherein the information may be sensitive/private and may not be intended for sharing with other (e.g., unauthorized) devices. In another instance, the POS platforms may have the capability of providing various digitally supported services such as, for example, selling goods and accepting fund transfer from online accounts via mobile devices, or providing other services (e.g., tickets, reservations, etc.) Additionally, a user may utilize an NFC enabled device (e.g., a mobile phone, a tablet, etc.) to extract data from an NFC memory tag by touching the tag with the device (e.g., very close, within an inch, touch-distance-radio, etc.), wherein the data may include a free ring-tone, a URL, or even the configuration for a local Wi-Fi hotspot, wherein the memory tag may be a passive device (e.g., a memory tag without its own power source) or may be associated with an active device (e.g., with its own power source and processor.) Moreover, the wireless memory tags may be capable of high data rate transfers as well as include high storage capacities.

As implementation of such communication and sharing methods become more prevalent, users are becoming more willing utilize the methods to share a wide range of information, which include personal data, with other users and devices; however, other opportunistic users and devices may attempt unauthorized access to the user devices and data therein (e.g., reading and/or writing.) For example, a first user may utilize a device (e.g., a first mobile phone, a bank card, etc.) for establishing a wireless communication link for sending and/or receiving certain information to/from another nearby target device; however, an unauthorized user may utilize another device (e.g., another mobile phone), for example at a remote distance, to request and gain a fraudulent access to the device and information of the first user while pretending to be the intended nearby target device. Further, an unauthorized device at a nearby location may be programmed to attempt and take control of (e.g., hijack) a communication link between two other devices which may not be aware of the presence of the unauthorized device.

To address, at least these problems, a system 100 of FIG. 1 introduces the capability of proving security mechanism for proximity-based interactions among devices. More specifically, a first device; for example, a mobile phone, a smart card, a tablet, a memory card, a passive device, an active device, and the like, may determine if a communication link between the first device and a nearby target device is in fact a communication link between only the first device and the intended target device. For example, a user is using a first device to communicate with a target device, wherein the first device and the target device may allow interaction between the devices for reading, transferring, sending, and/or writing data from and to the other respective device. In another instance, the first device may utilize the communication link to determine a location of a target device. In one embodiment, the first device may identify its location and notify the target device when allowing an interaction between the first and the target devices. In various instances, a first device and/or a target device may include power, storage, and computational resources or may be a passive device which may include resources (e.g., circuitry) for storing data and responding to other devices, wherein a passive device may receive power and/or data signals from an active device.

Although users and user devices may employ a range of security mechanisms (e.g., user ID, device ID, paring, acceptance, etc.) when establishing communication links for sharing data between various devices, in certain scenarios, users may wish to quickly establish the communication link with minimal setup requirements, for example, without the use of all traditional security mechanisms. However, when a user identifies a target device that is in close proximity (e.g., within inches), which is a device the user would like to establish a communication link with, the user may utilize the mechanisms of the system 100 to achieve a desired security level. In various embodiments, one or more characteristics (e.g., phase, amplitude, power, time, etc.) of one or more communication signals (signals) may be analyzed to determine an authorized communication link and access rights. In one embodiment, the system 100 may process a plurality of signals to determine differences between corresponding phase, power, amplitude, and the like signals and further determine location and/or direction of one or more potential signal sources (e.g., devices.) In one scenario, two NFC enabled devices (e.g., a mobile device and a memory card) or any other wirelessly powered/enabled devices may establish a communication link when the two devices are brought substantially close to each other, wherein the two devices may include a plurality of antennas for transmitting and receiving the signals, for example, data signals, power signals, reference signals, and the like. Further, a receiving device may receive a plurality of transmission signals via a plurality of antennas, wherein the receiving device may process, analyze, deduce, etc. differences in characteristics of the plurality of the transmission signals so to determine if the transmitting device is substantially close to the receiving device.

In one embodiment, the plurality of antennas may be situated at different physical locations on a device, wherein signals (e.g., from a same source) received at the plurality of antennas may have different characteristics. In one embodiment, if there is little or no difference in characteristics of the received signals, then it may be determined that the source of the signals (e.g., a transmitting device) may be at a farther distance from the receiving device. In one embodiment, higher number of antennas on a device may allow for analysis and determination of additional information, in multiple spatial planes, for estimation of more accurate directional and/or location information of a device associated with the transmitted signals. In one embodiment, one or more processes for the comparison, analysis, determination, and the like may be performed (e.g., at a receiving device) by utilizing one or more processors, algorithms, applications, and the like. In one embodiment, the one or more processes may be performed, at least in part, by one or more circuits (e.g., electronic passive, active, analog, digital, etc.)

In one embodiment, the system 100 determines a request for interaction between at least one first device and at least one second device, wherein at least the at least one first device is associated with at least one first antenna and at least one second antenna. In one embodiment, the at least one first device may be a wireless memory tag which may be embedded into a device, for example a mobile phone, wherein the wireless memory tag and/or the device may include a plurality of antennas for receiving/transmitting various RF signals. In one embodiment, the at least one second device may be user device (e.g., a mobile phone, an NFC reader, a network device (e.g., a computer, a kiosk, etc.), an active device (e.g., including power, processor, etc.), a passive device (e.g., a memory card, a memory tag, etc.) In one embodiment, the wireless memory tag may be embedded into a user item; for example a bank card, an ID card, a passport, a wallet, and the like, wherein the wireless memory tag include the plurality of antennas. In one embodiment, the request for interaction may be a request for access to read, write, modify, transfer, inquire, or a combination thereof. In one embodiment, the interaction includes a communication via an NFC protocol. In one embodiment, the at least one first device, the at least one second device, or a combination thereof is and/or may be associated with a wireless memory tag, a passive device, an active device, or a combination thereof.

In one embodiment, the system 100 determines a first signal received by the at least one first antenna and a second signal received by the at least one second antenna. In one embodiment, a memory tag and/or a device (e.g., a tablet) may receive a plurality of signals from one or more other devices and/or memory tags. For example, a memory tag may receive a plurality of signals via a plurality of its antennas. In one example, a device (e.g., a mobile phone) may detect a plurality of signals associated with a proximity-based communication device (e.g., a memory tag, another device, etc.) In one embodiment, the first signal and the second signal include one or more data signals, one or more power signals, one or more reference signals, or a combination thereof.

In one embodiment, the system 100 determines one or more differences in one or more characteristics of the first signal and the second signal. In one embodiment, a device may utilize one or more processors, algorithms, circuitries, components, digital and/or analog, and the like to process the plurality of signals for determining one or more characteristics, one or more parameters, one or more properties, and the like associated with the signals. In one embodiment, the one or more characteristics include, at least in part, one or more a signal phases, signal amplitudes, powers, S/N ratios, and the like. In one embodiment, a memory tag may utilize one or more circuitries including a plurality of components (e.g., analog) to determine the characteristics. In various embodiments, the device and/or memory tag may determine one or more differences in the one or more characteristics associated with each signal. For example, a first signal may have a different phase, amplitude, power, etc. when compared to the characteristics of a second signal, a third signal, etc.

In one embodiment, the system 100 processes and/or facilitates a processing of the one or more differences to determine whether to allow the interaction. In one embodiment, a device and/or a memory tag may allow an interaction requested by another device and/or memory tag. For example, a second device and/or memory tag may be requesting to access (e.g., read/write/modify) certain data at a first device and/or memory tag. For example, a memory tag may disable one or more components in one or more circuitries to disallow an interaction. In one embodiment, a device may utilize one or more processors and/or applications to deny the interaction.

In one embodiment, the system 100 causes, at least in part, one or more comparisons of the one or more differences to one or more threshold values. In one embodiment, the one or more determined differences may be compared to one or more threshold values to determine proximity (e.g., location) of a source associated with one or more certain signals. For example, it may be determined that signals from a second device and/or a second memory tag, which are assumed to be located at a certain distance from a first device and/or a first memory tag, should have certain characteristics associated with the signals. For example, two signals received from a second device (e.g., a source device) located at a close distance of two-to-three centimeters away from a first device (e.g., a target device) should have a phase and/or an amplitude difference greater than a certain threshold value, wherein if the differences are less than the certain threshold value, it may be indicative that the source of the signals (e.g., the source device) is not necessarily located within that close distance. In one embodiment, location and surroundings of the devices requesting interaction among the devices may be suggest certain signal characteristics that should be present when a first device and a target device interact. For example, if the first device and the target device are in a large open space (e.g., a park) the signal characteristics of the interaction may differ from a setting where the devices are in a room.

In one embodiment, the system 100 causes, at least in part, a discontinuation of the interaction based, at least in part, on the one or more comparisons. In one embodiment, a device and/or a memory tag may allow an interaction requested by another user device and/or memory tag and later the allowed interaction and/or a communication link may be disabled if the one or more comparisons indicate one or more parameter and/or characteristic values outside a threshold value range. For example, a second device and/or memory tag may be accessing (e.g., read/write) certain data at a first device and/or memory tag. In one example, a memory tag may disable one or more components in its one or more circuitries to discontinue a communication link and disengage from an interaction.

In one embodiment, the system 100 causes, at least in part, a presentation of a UI comprising one or more indicators, one or more messages, or a combination thereof for providing instructing information, status information, or a combination thereof on the interaction. In one embodiment, a UI may present a warning that a request for an interaction and/or a communication link is potentially fraudulent, or is suspicious, or is from a remote source device, and the like. In one embodiment, a user of a target device may be prompted to take certain actions, for example, to move the target device so that different set of signals may be captured and new characteristics may be determined.

In one embodiment, the system 100 causes, at least in part, an estimation of a distance between the at least one first device and the at least one second device based, at least in part, on the one or more differences. In one embodiment, a device may utilize various processors, algorithms, circuitries, and the like to analyze one or more parameters of the one or more differences so that a distance between at least a first device and a second device may be determined. For example, differences in amplitude, in power, in phase, etc. may be indicative of the distance.

In one embodiment, the system 100 determines whether to allow the interaction based, at least in part, on the distance. For example, if a source device is supposed to be within three centimeters of a user's target device and the estimated distance is calculated/determined to be greater than the supposed three centimeters, then a request from the source device to interact with the user's target device may be denied.

In one embodiment, the system 100 causes, at least in part, a presentation of a user interface comprising one or more indicators, one or more messages, or a combination thereof for providing directional information for, at least, locating the at least one first device, the at least one second device, or a combination thereof. In one embodiment, a first device may utilize one or more other components; for example, a gyroscope, an accelerometer, a compass, and the like, as well as the determined signal characteristics and/or differences associated with signals from a second device, to further determine and present directional information for locating/tracking the second device. For example, a user utilizes a first device to determine location information of a second device and directional information to the other device. In one embodiment, the at least one first device, the at least one second device, or a combination thereof may utilize the one or more indicators and/or the one or more messages for interacting with one or more other devices to perform one or more tasks associated with one or more gaming applications, one or more entertainment applications, one or more educational applications, and the like. For example, one or more users may try to locate various objects including memory tags placed within certain proximity of a user's location. In one example, a user may utilize the presented indicators for improving one or more users' abilities to follow directional information.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), one or more POS platforms 109a-109n (also collectively referred to as POS platform 109), one or more GPS satellites 111a-111n (also collectively referred to as GPS satellites 111), and/or with other components of the system 100 directly and/or via communication network 113. In one embodiment, the UEs 101 may include data/content collection modules 115a-115n (also collectively referred to as DC collection module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In one embodiment, the UEs 101 may include a proximity communication (PC) security module 116a-116n (also collectively referred to as PC module 116) for communicating with nearby devices (e.g., NFC devices for storing and/or transmitting data) and/or memory tags. In one embodiment, a PC module 116 may include a memory tag 117 for storing and/or retrieving data from. In one embodiment, a memory tag 117 (e.g., 117z) may also be embedded in and/or attached to a device other than a UE 101, for example, on a poster, at a kiosk, in a credit card, in an identification card, in a memory stick, and the like. In various embodiments, one or more elements of the PC security module may implemented on a memory tag 117 (e.g., 117z) whether or not the memory tag is associated (e.g., included) in UE 101. For example, one or more circuitries and/or components may be implemented onto a memory tag for providing the PC security features of the system 100. In various embodiments, the UE 101, the PC module 116, and/or the memory tag 117 may include a plurality of antennas for receiving and/or transmitting one or more signals including data, power, reference, and the like signals. In various embodiments, the UE 101 and/or the PC module 116 may include one or more processors, antennas, circuitries, components, algorithms, software, applications, and the like for effectuating communications with another PC enabled device (e.g., a UE 101, a memory tag 117, etc.) and/or for processing and analyzing the one or more signals to determine one or more characteristics associated with the signals. In one embodiment, the memory tag 117 may include one or more antennas, circuitries, components, and the like for effectuating communications with another PC enabled device (e.g., a UE 101, PC module, NFC reader, etc.) and/or for comparing and analyzing the one or more signals to determine one or more characteristics associated with the signals.

In one embodiment, the service providers 105 may include and/or have access to one or more databases 118a-118n (also collectively referred to as database 118), which may include various user information, user profiles, user preferences, one or more profiles of one or more user devices (e.g., device configuration, sensors information, etc.), service providers 105 information, other service providers' information, and the like. In one embodiment, the service providers 105 may include various service providers offering a range of services, for example, online shopping, social networking services (e.g., blogging), media upload, media download, media streaming, account management services, or a combination thereof. Further, the service providers 105 may conduct a search for content items, media items, information, coupons, and the like associated with one or more users, POIs, geo-locations, and the like.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like.

In one embodiment, the POS platform 109 may include and/or have access to a one or more database 121a-121n (also collectively referred to as database 121) to access and/or store information associated with various applications, contents, users, service providers, and the like. It is noted that the POS platform 109 may be a stand-alone entity in the system 100 (e.g., on a computer, on a server, etc.), a part of the service providers 105, a part of the content providers 107, included within the UE 101 (e.g., as part of the applications 103), or a combination thereof. Further, the POS platform 109, the service providers 105, and/or the content providers 107 may utilize one or more service application programming interfaces (APIs)/integrated interface, through which communication, media, content, and information (e.g., associated with users, applications, services, content, etc.) may be shared, accessed and/or processed.

The UEs 101 may be any type of mobile terminal, fixed terminal, or portable terminal including a mobile handset, NFC reader, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 111 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, the content providers 107, and the POS platform 109 may communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101 and the POS platform 109 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
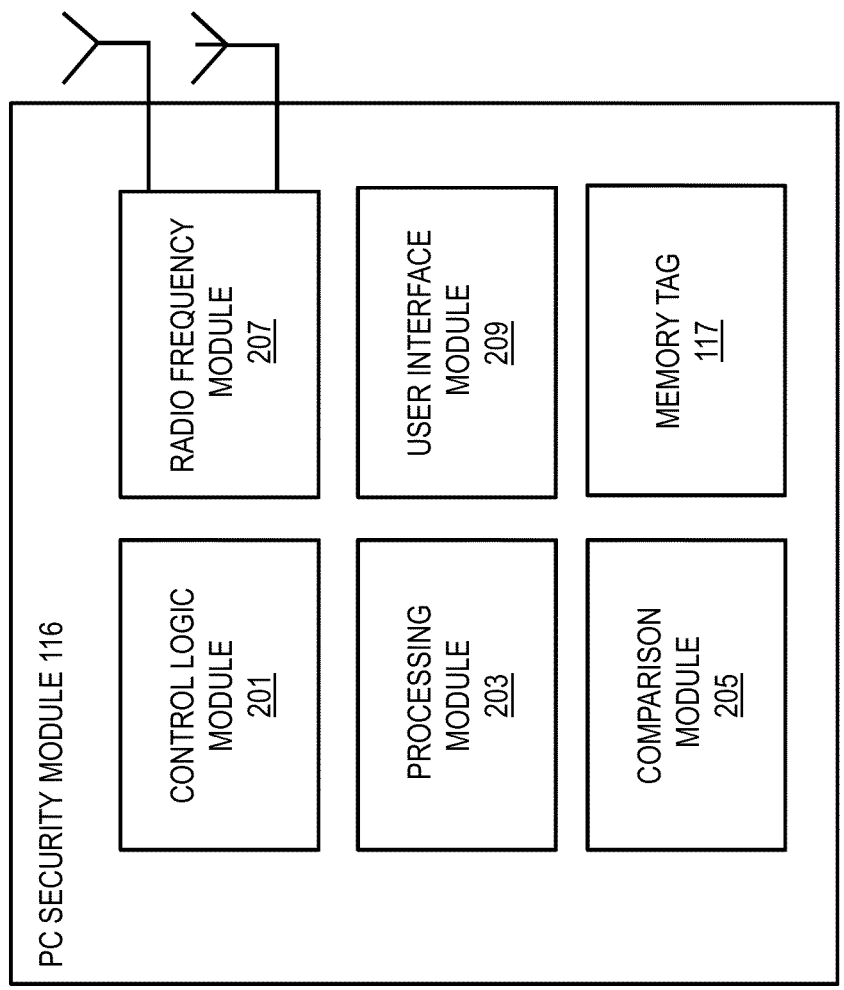
FIG. 2 is a diagram of the components of a PC module, according to an embodiment.

FIG. 2 is a diagram of the components of a PC module, according to an embodiment. By way of example, the PC module 116 includes one or more components for receiving, processing, and analyzing one or more communication signals for determining one or more characteristics. Further, the one or more characteristics may be utilized, at in part, to determine one or more security actions for one or more proximity based communication among a plurality of devices. It is contemplated that the functions of these components may be combined in one or more components or performed by other components of equivalent functionality. In this embodiment, the PC module 116 includes a control logic module 201, a processing module 203, a comparison module 205, a radio frequency (RF) module 207, a user interface (UI) module 209, and a memory tag 117.

The control logic module 201 oversees tasks, including tasks performed by control logic module 201, the processing module 203, the comparison module 205, the RF module 207, the UI module 209, and the memory tag 117. For example, although other modules may perform the actual task, the control logic module 201 may determine when and how those tasks are performed or otherwise direct the other modules to perform the tasks.

The processing module 203, may perform one or more processes associated with one or more signals, wherein the signals may be sampled, digitized, and/or processed in one or more methods so that the PC module 116 may further utilize the processed signals. In one embodiment, the processing module 203 may utilize one or more algorithms for transforming the signals to one or more digital signals, digital arrays, digital patterns, and the like. The comparison module 205 may compare the one or more processed signals to determine one or more characteristics associated with the signals. For example, the comparison module 205 may compare phase, amplitude, signal to noise (S/N) ratio, and other characteristics of each signal to one another. In one embodiment, the comparison module 205 may perform the comparison via one or more digital and/or analog components. In one embodiment the comparison module 205 may perform the comparisons on signals received via the processing module 203 and/or via the RF module 207.

In one embodiment, the RF module 207 may generate and/or receive one or more signals for effectuating one or more communication links/sessions with one or more other devices. In one embodiment, the RF module 207 may present one or more signals to the processing module 203 and/or to the comparison module 205 in an analog format for processing and/or comparison, wherein the processing module 203 and/or the comparison module 205 may do the processing and/or the comparison via analog circuitry and components. In one embodiment, the RF module 207 may include various circuitry and components or receiving and transmitting RF signals, wherein the signals may include data, power, control, and/or reference signals. In various embodiments, the RF module 207 includes and/or interfaces with a plurality of antennas for the receiving and transmitting of the RF signals.

The user interface (UI) module 209 may provide one or more mechanisms for presenting one or more information items (e.g., messages, indicators, location directions, etc.) to a user and/or receive input (e.g., selection) from the user. In various embodiments, the UI module 209 may receive the one or more information items from the processing module 203, the comparison module 205, the RF module 207, and the like for presentation to the user. In one embodiment, the UI module 209 may receive an input from the user, another module, and/or a service provider for selecting one or more actions for proceeding, continuing, stopping, denying, and the like process steps.

Figure 3C:
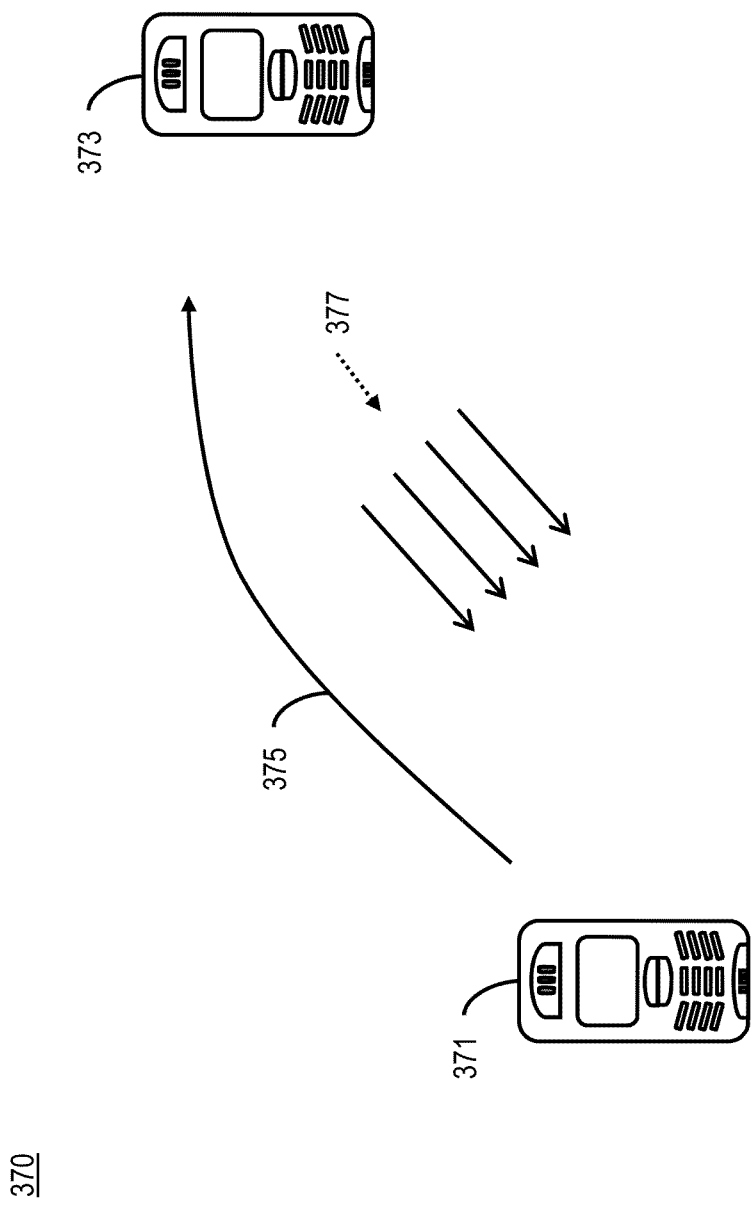

FIGS. 3A-3C illustrate various diagrams and schematics of processes and device interactions in the system 100, according to various embodiments.

FIG. 3A depicts diagram 300 including a memory tag 301 which includes two antennas 303 and 305, wherein there may be a plurality of antennas which may be placed at different physical locations on the memory tag (e.g., at two different ends of a bank card). Further, the memory tag 301 may be receiving RF communication signals from a device 307 (e.g., UE 101a, a POS, etc.) wherein the signals 309 and 311 are received at via, at least, the two antennas 303 and 305, but not in that particular matching order. In one embodiment, the received signals from the two antennas are processed/analyzed to determine one or more characteristics associated with the two signals. For example, amplitude, phase, power, etc. may be measured and recorded. In use case scenario, a second device 313 (e.g., UE 101*b*) may also request to communicate with and access the memory tag 301 via the RF communication signals 315 and 317, which are received, at least, via the antennas 303 and 305. It is noted that there may a plurality of antennas placed at different locations on the memory tag 301 and/or at a UE 101. In one embodiment, the signals 315 and 317 may be processed/analyzed by the memory tag 301 and/or by a UE 101 associated with the memory tag 301. In one example, the device 313 is at a farther location than the device 307, whereby determination and analysis of the characteristics associated with of the signals 315 and 317 indicate that the characteristics are similar, for example, similar phase, amplitude, power, and the like. In one embodiment, one or more circuitries on the memory tag 301 may disable any communication links with the device 313 as it may be determined that the device is outside of a suggested/suitable proximity communication range, wherein the device 313 may be attempting to "pretend" to be at a closer location that it may actually be. For example, the device 313 may attempt to fraudulently hijack a communication link and access information at the memory tag 301.

FIG. 3B depicts a flowchart 350 which may be implemented on a device (e.g., a memory tag, a mobile phone, etc.) which includes antennas 351 and 353 for receiving RF communication signals for proximity-based interactions among a plurality of devices. Signal "A" received at a target device via the antenna 351 is processed and analyzed, wherein at 355 one or more characteristics associated with the signal "A" are determined, which may include a signal phase, a amplitude, power, etc. Further, signal "B" received via the antenna 353 is processed and analyzed at 357 for determining one or more characteristics associated with the signal "B." Further, at 359 one or more processors and/or circuitries calculate/determine one or more differences between the one or more characteristics of the two signals "A" and "B." Furthermore, at 361, one or more processors and/or circuitries (e.g., analog comparators) may compare the calculated/determined differences from step 359 against one or more set criteria, threshold values, and/or ranges of values, wherein if the calculated/determined differences meet the criteria then the interaction may continue and/or may be allowed and/or continued at 363. However, if the calculated/determined differences do not meet the set criteria, then at 365 an alert/warning may be issued so that the user may take one or more actions (e.g., move the target device, the memory tag, etc.) to address any potential issues. In one embodiment, if there are no mechanisms available for a complete UI (e.g., display, input, etc.), for example on a memory tag (e.g., a bank card), then one or more suitable/available alerts may be presented to the user. For example, a memory tag may include a miniature vibrating component, analog resonating components (e.g., for audio), and/or other haptic/visual alerts (e.g., light strip).

FIG. 3C shows diagram 370 including device 371 and device 373, wherein a user wishes to utilize, for example, device 371 to locate/track device 373 or vice versa. In one embodiment, device 371 may broadcast one or more signals (e.g., beacons, SMS, etc.) via 375, wherein the device 373 may respond via one or more signals 377. In one embodiment, the device 371 may utilize one or more antennas to determine and analyze one or more characteristics associated with the signals 377 and present directional information to the user of device 371 for locating/tracking the device 373. For example, as the user moves with the device 371, at least one of the one or more characteristics of the signals 377 will change, whereby location information of the device 373 may be ascertained. In one embodiment, the device 371 may determine power levels in the one or more signals received from the device 373 and may make adjustments in its transmission power. For example, if the device 371 is measuring a low power in a signal received from the device 373 (e.g., device 373 may be farther away, there may be obstacles between the devices, etc.), then the device 371 may increase its own transmission power level to assure that the device 373 can receive signals transmitted from the device 371. In one example, the device 371 may decrease its transmission power level if the distance to the device 373 is determined to be closer than a previous location point. In one embodiment, the device 371 may include a request, in signals transmitted to the device 373, for the device 373 to increase/decrease its transmission power level.

Figure 8:
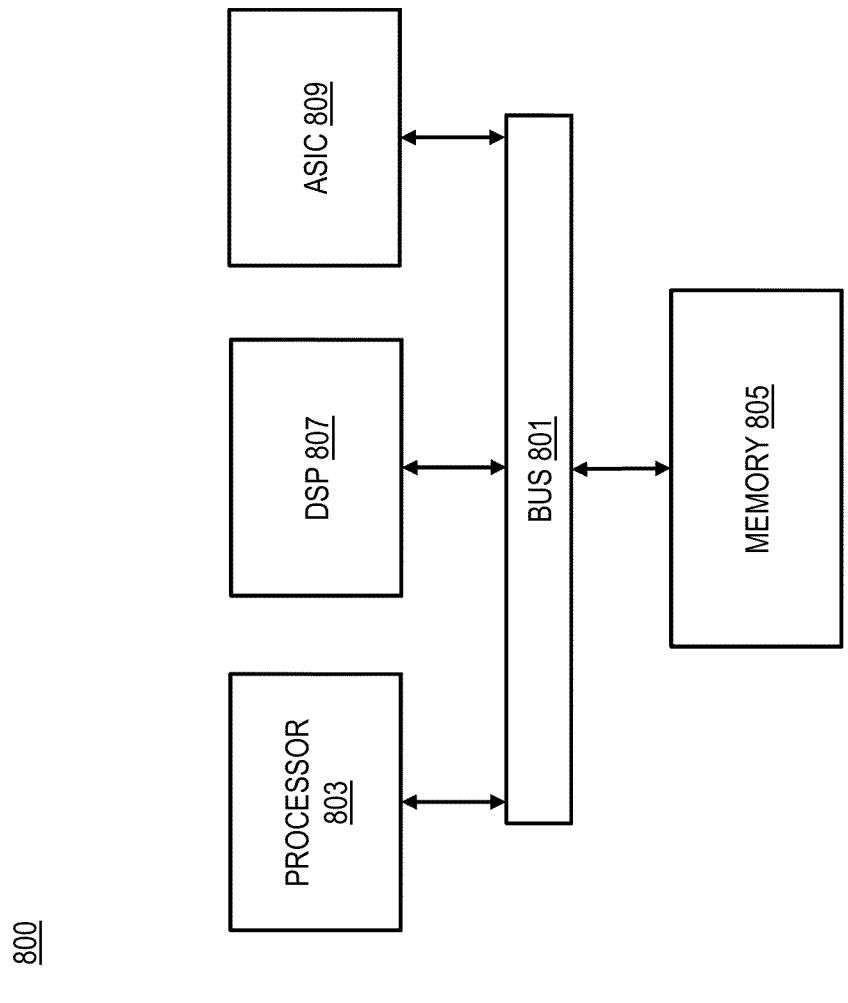
FIG. 8 illustrates a chip set or chip 800 upon which an embodiment of the invention may be implemented.

FIG. 4 is a flowchart of a process for, at least, determining a request for interaction among devices, according to an embodiment. In various embodiments, the PC module 116 and/or the memory tag 117 may perform the process 400 and may be implemented in, for instance, a chip set including a processor and a memory as shown in FIG. 8. As such, the PC module 116 and/or the memory tag 117 can provide means for accomplishing various parts of the process 400 as well as means for accomplishing other processes in conjunction with other components of the system 100. Throughout this process, the memory tag 117 is referred to as completing various portions of the process 400, however, it is understood that other components of the system 100 can perform some of and/or all of the process steps. Further, in various embodiments, the PC module 116 and/or the memory tag 117 may be implemented in one or more entities of the system 100.

In step 401, the PC module 116 determines a request for interaction between at least one first device and at least one second device, wherein at least the at least one first device is associated with at least one first antenna and at least one second antenna. In one embodiment, the at least one first device may be a wireless memory tag which may be embedded into a device, for example a mobile phone, wherein the memory tag and/or the device may include a plurality of antennas for receiving/transmitting various RF signals. In one embodiment, the at least one second device may be user device (e.g., a mobile phone, an NFC reader, a network device (e.g., a computer, a kiosk, etc.), an active device (e.g., including power, processor, etc.), a passive device (e.g., a memory card, a memory tag, etc.) In one embodiment, the memory tag may be embedded into a user item; for example a bank card, an ID card, a passport, a wallet, and the like, wherein the memory tag include the plurality of antennas. In one embodiment, the request for interaction may be a request for access to read, write, modify, transfer, inquire, or a combination thereof. In one embodiment, the interaction includes a communication via an NFC protocol. In one embodiment, the at least one first device, the at least one second device, or a combination thereof is and/or may be associated with a wireless memory tag, a universal local storage, a passive device, an active device, or a combination thereof.

In step 403, the PC module 116 determines a first signal received by the at least one first antenna and a second signal received by the at least one second antenna. In one embodiment, a memory tag and/or a device (e.g., a tablet) may receive a plurality of signals from one or more other devices and/or memory tags. For example, a memory tag may receive a plurality of signals via a plurality of its antennas. In one example, a device (e.g., a mobile phone) may detect a plurality of signals associated with a proximity-based communication device (e.g., a memory tag, another device, etc.) In one embodiment, the first signal and the second signal include one or more data signals, one or more power signals, one or more reference signals, or a combination thereof.

In step 405, the PC module 116 determines one or more differences in one or more characteristics of the first signal and the second signal. In one embodiment, a device may utilize one or more processors, algorithms, circuitries, components, digital and/or analog, and the like to process the plurality of signals for determining one or more characteristics, one or more parameters, one or more properties, and the like associated with the signals. In one embodiment, the one or more characteristics include, at least in part, one or more a signal phases, signal amplitudes, powers, S/N ratios, and the like. In one embodiment, a memory tag may utilize one or more circuitries including a plurality of components (e.g., analog) to determine the characteristics. In various embodiments, the device and/or memory tag may determine one or more differences in the one or more characteristics associated with each signal. For example, a first signal may have a different phase, amplitude, power, etc. when compared to the characteristics of a second signal, a third signal, etc.

In step 407, the PC module 116 processes and/or facilitates a processing of the one or more differences to determine whether to allow the interaction. In one embodiment, a device and/or a memory tag may allow an interaction requested by another device and/or memory tag. For example, a second device and/or memory tag may be requesting to access (e.g., read/write/modify) certain data at a first device and/or memory tag. For example, a memory tag may disable one or more components in one or more circuitries to disallow an interaction. In one embodiment, a device may utilize one or more processors and/or applications to deny the interaction.

Figure 5:
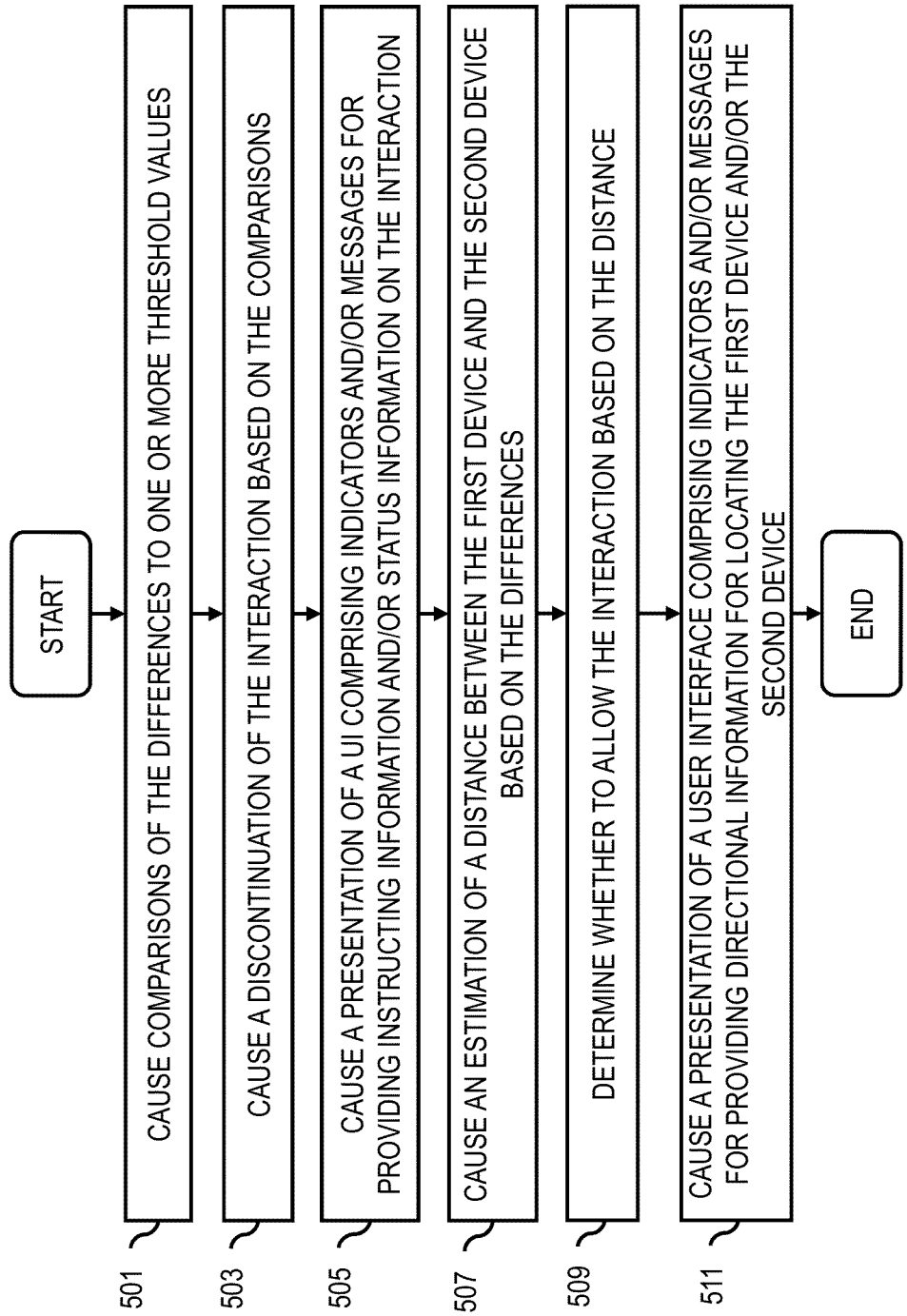
FIG. 5 is a flowchart of a process for, at least, comparing one or more differences to one or more threshold values, according to various embodiments.

FIG. 5 is a flowchart of a process for, at least, comparing one or more differences to one or more threshold values, according to various embodiments. In various embodiments, the PC module 116 and/or the memory tag 117 may perform the process 500 and may be implemented in, for instance, a chip set including a processor and a memory as shown in FIG. 8. As such, the PC module 116 and/or the memory tag 117 can provide means for accomplishing various parts of the process 500 as well as means for accomplishing other processes in conjunction with other components of the system 100. Throughout this process, the memory tag 117 is referred to as completing various portions of the process 500, however, it is understood that other components of the system 100 can perform some of and/or all of the process steps. Further, in various embodiments, the PC module 116 and/or the memory tag 117 may be implemented in one or more entities of the system 100.

In step 501, the PC module 116 causes, at least in part, one or more comparisons of the one or more differences to one or more threshold values. In one embodiment, the one or more determined differences may be compared to one or more threshold values to determine proximity (e.g., location) of a source associated with one or more certain signals. For example, it may be determined that signals from a second device and/or a second memory tag, which are assumed to be located at a certain distance from a first device and/or a first memory tag, should have certain characteristics associated with the signals. For example, two signals received from a second device (e.g., a source device) located at a close range of two-to-three centimeters away from a first device (e.g., a target device) should have a phase and/or amplitude difference greater than a certain threshold value, wherein if the differences are less than the certain threshold value, it may be indicative that the source of the signals (e.g., the source device) is not necessarily located within that close distance.

In step 503, the PC module 116 causes, at least in part, a discontinuation of the interaction based, at least in part, on the one or more comparisons. In one embodiment, a device and/or a memory tag may allow an interaction requested by another user device and/or memory tag and later the allowed interaction and/or a communication link may be disabled if the one or more comparisons indicate one or more parameter and/or characteristic values outside a threshold value range. For example, a second device and/or memory tag may be accessing (e.g., read/write) certain data at a first device and/or memory tag. In one example, a memory tag may disable one or more components in its one or more circuitries to discontinue a communication link and disengage from an interaction.

In step 505, PC module 116 causes, at least in part, a presentation of a UI comprising one or more indicators, one or more messages, or a combination thereof for providing instructing information, status information, or a combination thereof on the interaction. In one embodiment, a UI may present a warning that a request for an interaction and/or a communication link is potentially fraudulent, or is suspicious, or is from a remote source device, and the like. In one embodiment, a user of a target device may be prompted to take certain actions, for example, to move the target device so that different set of signals may be captured and new characteristics may be determined.

In step 507, the PC module 116 causes, at least in part, an estimation of a distance between the at least one first device and the at least one second device based, at least in part, on the one or more differences. In one embodiment, a device may utilize various processors, algorithms, circuitries, and the like to analyze one or more parameters of the one or more differences so that a distance between at least a first device and a second device may be determined. For example, differences in amplitude, in power, in phase, etc. may be indicative of the distance.

In step 509, the PC module 116 determines whether to allow the interaction based, at least in part, on the distance. For example, if a source device is supposed to be within three centimeters of a user's target device and the estimated distance is calculated/determined to be greater than the supposed three centimeters, then a request from the source device to interact with the user's target device may be denied.

In step 511, PC module 116 causes, at least in part, a presentation of a user interface comprising one or more indicators, one or more messages, or a combination thereof for providing directional information for, at least, locating the at least one first device, the at least one second device, or a combination thereof. In one embodiment, a first device may utilize one or more other components; for example, a gyroscope, an accelerometer, a compass, and the like, as well as the determined signal characteristics and/or differences associated with signals from a second device, to further determine and present directional information for locating/tracking the second device. For example, a user utilizes a first device to determine location information of a second device and directional information to the other device. In one embodiment, the at least one first device, the at least one second device, or a combination thereof may utilize the one or more indicators and/or the one or more messages for interacting with one or more other devices to perform one or more tasks associated with one or more gaming applications, one or more entertainment applications, one or more educational applications, and the like. For example, one or more users may try to locate various objects including memory tags placed within certain proximity of a user's location. In one example, a user may utilize the presented indicators for improving one or more users' abilities to follow directional information.

Figures 6A, 6B:
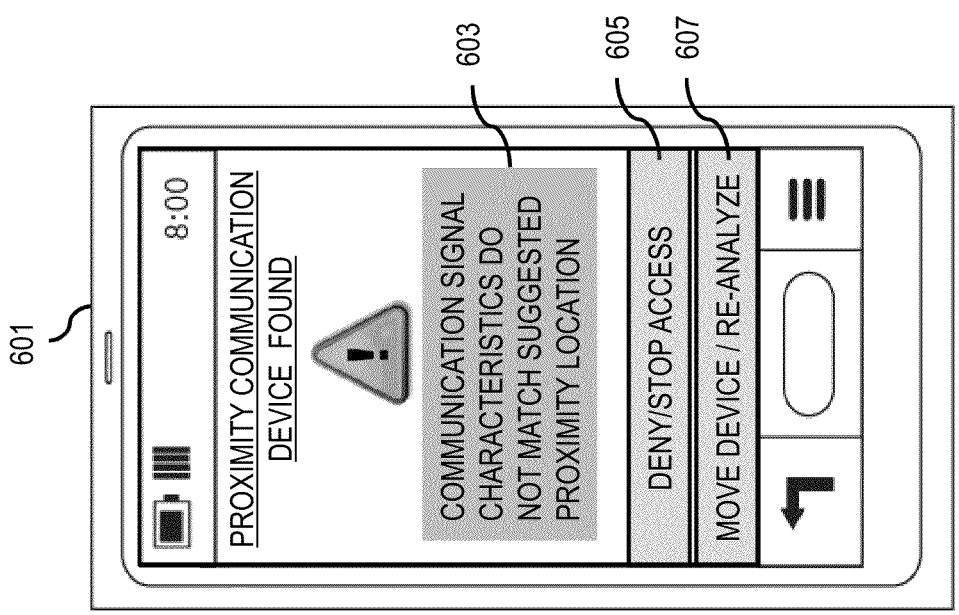
FIGS. 6A and 6B are example UI diagrams utilized in the processes of FIGS. 4 and 5, according to various embodiments.

FIGS. 6A and 6B are example UI diagrams utilized in the processes of FIGS. 4 and 5, according to various embodiments. As shown, the example UIs of FIGS. 6A and 6B include UIs 601 and 631 including elements and/or functionalities created and/or modified based, at least in part, on information, data, and/or signals resulting from the processes (e.g., processes 400 and/or 500.) Referring to FIG. 6A, UI 601 of a device indicates that one or more nearby devices capable of proximity communication (e.g., NFC) have been found. In one embodiment, based on one or more analysis from device 601, the UI 601 may present an alert 603 indicative of potential issues (e.g., security issues) associated with one or more proximity communication requests/attempts. In one embodiment, the user may be presented with one or more options, for example, 605 and 607 whereby the user may select to deny/stop any access at 605, or at 607 the user may choose to move the device 601, whereby the device may re-analyze the communication signals.

In FIG. 6B, the UI 631 presents to user of device 631 information associated with one or more other nearby devices capable of proximity communications. In one embodiment, the UI 631 may present directional information 633 for locating the one or more other nearby devices, wherein the information may be based on one or more communication signal characteristics processed and analyzed by the device 631. In one example, a user may choose from a range of options to, for example, find/track the device via 635, find/track one or more other devices via 637, and the like. In various embodiments, as the user and the device 631 move, the presented information 633 and available options may be updated to reflect change in respective location information.

The processes described herein for providing security mechanism for proximity-based interactions among devices may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
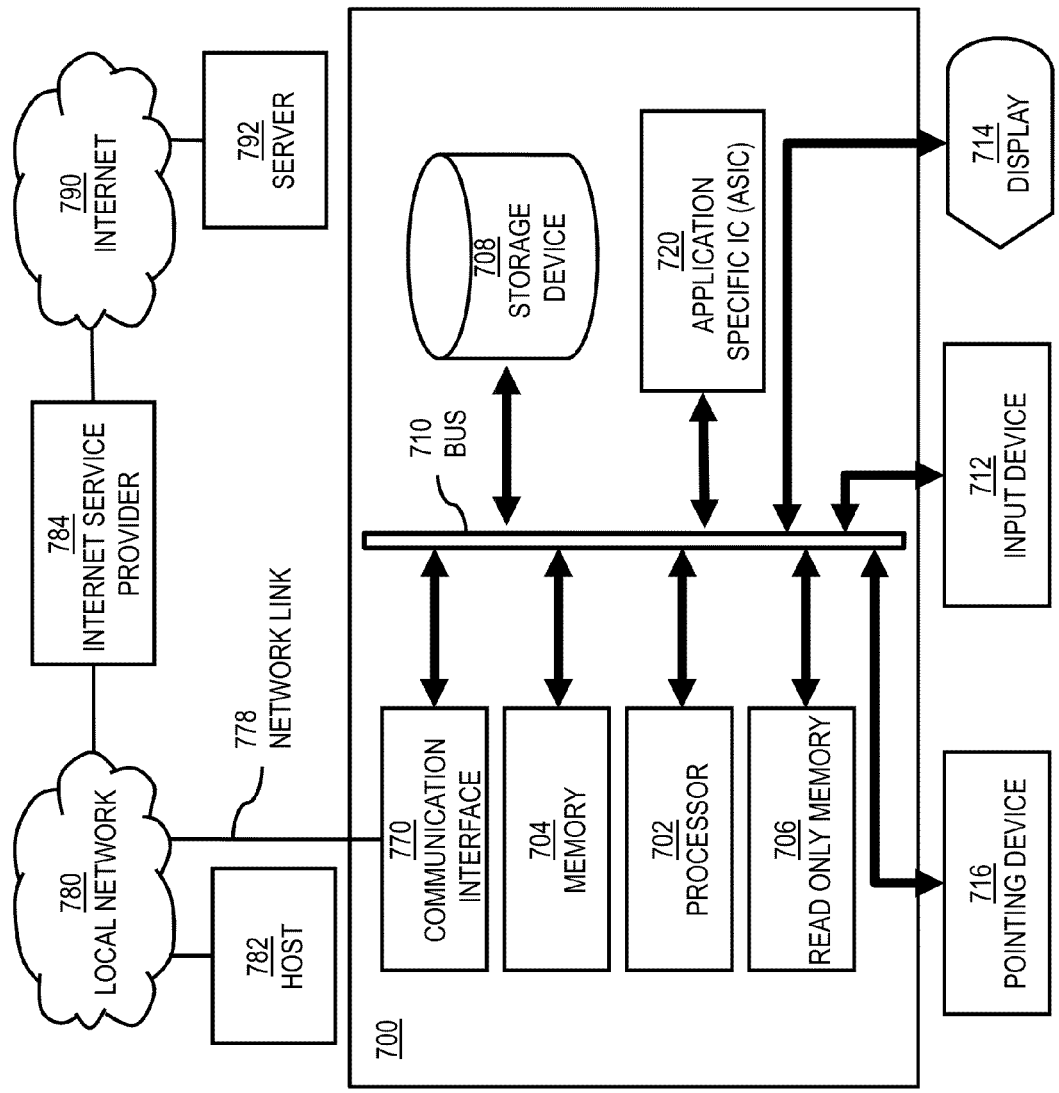
FIG. 7 illustrates a computer system 700 upon which an embodiment of the invention may be implemented.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide security mechanism for proximity-based interactions among devices as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character.

In some embodiments, information called analog data is represented by a near continuum of measurable values within a particular range. Computer system 700, or a portion thereof, constitutes a means for performing one or more steps of providing security mechanism for proximity-based interactions among devices.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing security mechanism for proximity-based interactions among devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing security mechanism for proximity-based interactions among devices. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing security mechanism for proximity-based interactions among devices, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714, and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners, and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic, or electromagnetic signals, including infrared and optical signals that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 113 for providing security mechanism for proximity-based interactions among devices.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780, and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed for providing security mechanism for proximity-based interactions among devices as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing security mechanism for proximity-based interactions among devices.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide security mechanism for proximity-based interactions among devices. The memory 805 also stores the data associated with or generated by the execution of the inventive steps.

Figure 9:
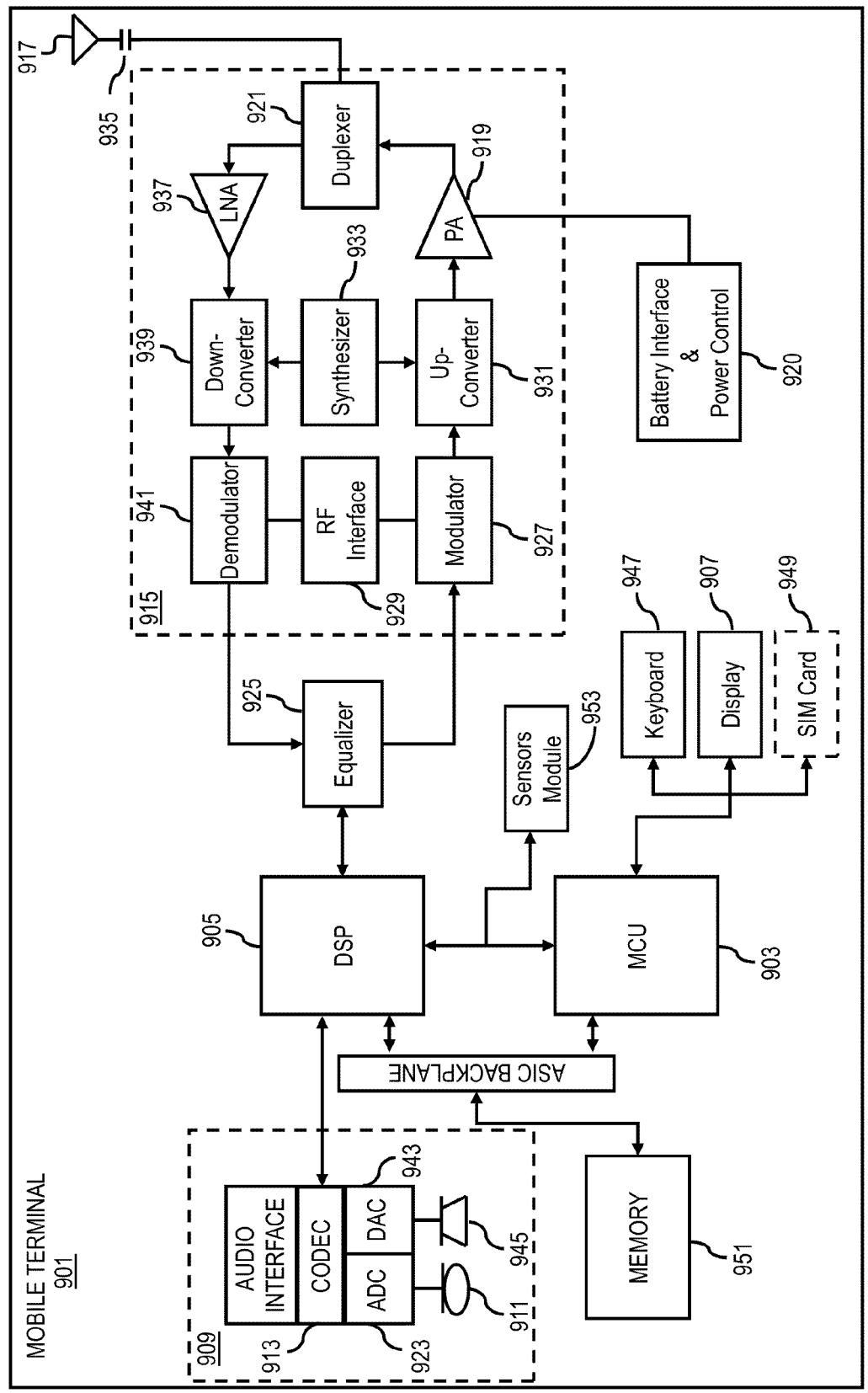
FIG. 9 is a diagram of a mobile terminal (e.g., handset) that can be used to implement an embodiment of the invention.

FIG. 9 is a diagram of a mobile terminal (e.g., handset) that can be used to implement an embodiment of the invention. In some embodiments, mobile terminal 901, or a portion thereof, constitutes a means for performing one or more steps of providing security mechanism for proximity-based interactions among devices. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing security mechanism for proximity-based interactions among devices. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 for providing security mechanism for proximity-based interactions among devices. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Additionally, sensors module 953 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 901 (e.g., a mobile phone), a user of the mobile terminal 901, an environment of the mobile terminal 901 and/or the user, or a combination thereof, wherein the data may be collected, processed, stored, and/or shared with one or more components and/or modules of the mobile terminal 901 and/or with one or more entities external to the mobile terminal 901.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
- at least one determination of a request for interaction between at least one first device and at least one second device, wherein at least the at least one first device is associated with at least one first antenna and at least one second antenna;
- at least one determination of a first signal received by the at least one first antenna and a second signal received by the at least one second antenna;
- at least one determination of one or more differences in one or more characteristics of the first signal and the second signal; and
- a processing of the one or more differences to determine whether to allow the interaction.

2. A method of claim 1,
- wherein the one or more characteristics include, at least in part, one or more signal phases, one or more signal amplitudes, one or more powers, one or more S/N ratios, or a combination thereof, and
- wherein the interaction between the devices includes one or more of reading, transferring, sending, and writing of data from and/or to the respective devices.

3. A method of claim 1,
- wherein the first signal and the second signal include one or more data signals, one or more power signals, one or more reference signals, or a combination thereof,
- wherein the first signal and the second signal are characterized as having one or more differences between the first signal and the second signal in the one or more data signals, the power signals, the reference signals or the combinations thereof, and
- wherein the differences are based on one or more of phase, power, amplitude and S/N ratio of the first signal and second signal.

4. A method of claim 1, wherein the (1) data and/or (2) information and/or (3) at least one signal are further based, at least in part, on the following:
- one or more comparisons of the one or more differences to one or more threshold values; and
- a discontinuation of the interaction based, at least in part, on the one or more comparisons.

5. A method of claim 1, wherein the (1) data and/or (2) information and/or (3) at least one signal are further based, at least in part, on the following:
- a presentation of a user interface comprising one or more indicators, one or more messages, or a combination thereof for providing instructing information, status information, or a combination thereof on the interaction.

6. A method of claim 1, wherein the interaction includes a near field communication protocol.

7. A method of claim 1, wherein the at least one first device, the at least one second device, or a combination thereof is associated with a wireless memory tag, with a universal local storage, with a passive device, with an active device, or a combination thereof.

8. A method of claim 1, wherein the (1) data and/or (2) information and/or (3) at least one signal are further based, at least in part, on the following:
- an estimation of a distance between the at least one first device and the at least one second device based, at least in part, on the one or more differences; and
- at least one determination of whether to allow the interaction based, at least in part, on the distance.

9. A method of claim 8, wherein the (1) data and/or (2) information and/or (3) at least one signal are further based, at least in part, on the following:
- a presentation of a user interface comprising one or more indicators, one or more messages, or a combination thereof for providing directional information for, at least, locating the at least one first device, the at least one second device, or a combination thereof.

10. A method of claim 9, wherein the at least one first device, the at least one second device, or a combination thereof utilize the one or more indicators, the one or more messages, or a combination thereof for interacting with one or more other devices to perform one or more tasks associated with one or more gaming applications, one or more entertainment applications, one or more educational applications, or a combination thereof.

11. An apparatus comprising:
- at least one processor; and
- at least one memory including computer program code for one or more programs, the at least one memory and the computer program code configured to, with the at least one processor, cause the apparatus to perform at least the following,
- determine a request for interaction between at least one first device and at least one second device, wherein at least the at least one first device is associated with at least one first antenna and at least one second antenna;
- determine a first signal received by the at least one first antenna and a second signal received by the at least one second antenna;
- determine one or more differences in one or more characteristics of the first signal and the second signal; and
- process and/or facilitate a processing of the one or more differences to determine whether to allow the interaction.

12. An apparatus of claim 11,
- wherein the one or more characteristics include, at least in part, one or more signal phases, one or more signal amplitudes, one or more powers, one or more S/N ratios, or a combination thereof, and
- wherein the interaction between the devices includes one or more of reading, transferring, sending, and writing of data from and/or to the respective devices.

13. An apparatus of claim 11,
- wherein the first signal and the second signal include one or more data signals, one or more power signals, one or more reference signals, or a combination thereof,
- wherein the first signal and the second signal are characterized as having one or more differences between the first signal and the second signal in the one or more data signals, the power signals, the reference signals or the combinations thereof, and
- wherein the differences are based on one or more of phase, power, amplitude and S/N ratio of the first signal and second signal.

14. An apparatus of claim 11, wherein the apparatus is further caused to:
- cause, at least in part, one or more comparisons of the one or more differences to one or more threshold values; and
- cause, at least in part, a discontinuation of the interaction based, at least in part, on the one or more comparisons.

15. An apparatus of claim 11, wherein the apparatus is further caused to:
- cause, at least in part, a presentation of a user interface comprising one or more indicators, one or more messages, or a combination thereof for providing instructing information, status information, or a combination thereof on the interaction.

16. An apparatus of claim 11, wherein the interaction includes a near field communication protocol.

17. An apparatus of claim 11, wherein the at least one first device, the at least one second device, or a combination thereof is associated with a wireless memory tag, with a universal local storage, with a passive device, with an active device, or a combination thereof.

18. An apparatus of claim 11, wherein the apparatus is further caused to:
cause, at least in part, an estimation of a distance between the at least one first device and the at least one second device based, at least in part, on the one or more differences; and
determine whether to allow the interaction based, at least in part, on the distance.

19. An apparatus of claim 18, wherein the apparatus is further caused to:
cause, at least in part, a presentation of a user interface comprising one or more indicators, one or more messages, or a combination thereof for providing directional information for, at least, locating the at least one first device, the at least one second device, or a combination thereof.

20. An apparatus of claim 19, wherein the at least one first device, the at least one second device, or a combination thereof utilize the one or more indicators, the one or more messages, or a combination thereof for interacting with one or more other devices to perform one or more tasks associated with one or more gaming applications, one or more entertainment applications, one or more educational applications, or a combination thereof.

* * * * *